(12) United States Patent
Sun (10) Patent No.: US 7,486,278 B2
(45) Date of Patent: Feb. 3, 2009

(54) TOUCH PAD DEVICE FOR PORTABLE COMPUTER

(75) Inventor: You-Myoung Sun, Seoul (KR)

(73) Assignee: LG Electronics Inc., Seoul (KR)

( * ) Notice: Subject to any disclaimer, the term of this patent is extended or adjusted under 35 U.S.C. 154(b) by 535 days.

(21) Appl. No.: 10/909,352

(22) Filed: Aug. 3, 2004

(65) Prior Publication Data

US 2005/0057525 A1 Mar. 17, 2005

(30) Foreign Application Priority Data

Aug. 11, 2003 (KR) ...................... 10-2003-0055515

(51) Int. Cl.
*G06F 3/041* (2006.01)
(52) U.S. Cl. ..................................... 345/173
(58) Field of Classification Search .................. 345/156, 345/157, 173–179
See application file for complete search history.

(56) References Cited

U.S. PATENT DOCUMENTS

| | | | |
|---|---|---|---|
| 6,177,924 B1 * | 1/2001 | Bae | 345/157 |
| 6,388,660 B1 * | 5/2002 | Manser et al. | 345/173 |
| 6,614,423 B1 * | 9/2003 | Wong et al. | 345/173 |
| 6,933,929 B1 * | 8/2005 | Novak | 345/173 |
| 7,013,558 B2 * | 3/2006 | Bachman | 29/832 |
| 2003/0025668 A1 * | 2/2003 | Lin | 345/156 |

FOREIGN PATENT DOCUMENTS

KR 20-0021160 12/2000

* cited by examiner

*Primary Examiner*—Richard Hjerpe
*Assistant Examiner*—Shaheda A Abdin
(74) *Attorney, Agent, or Firm*—Birch, Stewart, Kolasch & Birch, LLP (57) ABSTRACT

A touch pad device, for use in a portable computer, includes a touch pad housing that is recessed into and integrally formed on a top surface of a key deck. A pad assembly is securely seated into the touch pad housing and includes a touch pad. A pad cover is fastened to the touch pad housing, with the pad assembly installed therebetween, by hooks. Since the touch pad housing is integrally formed on the key deck, the number of component parts of the touch pad device is minimized and the man-hours for assembly is reduced. Further, since the pad cover can be installed and separated from above the key deck, maintenance of the pad assembly is simplified.

19 Claims, 6 Drawing Sheets

Related Art

TOUCH PAD DEVICE FOR PORTABLE COMPUTER

The present application claims, under 35 U.S.C. § 119, the priority benefit of Korean Patent Application No. P03-055515 filed Aug. 11, 2003 in Republic of Korea, the entire contents of which are herein fully incorporated by reference.

BACKGROUND OF THE INVENTION

1. Field of the Invention

The present invention relates to a portable computer, and more particularly, to a touch pad device that is used in a portable computer as an input device.

2. Description of the Related Art

Figure 5:
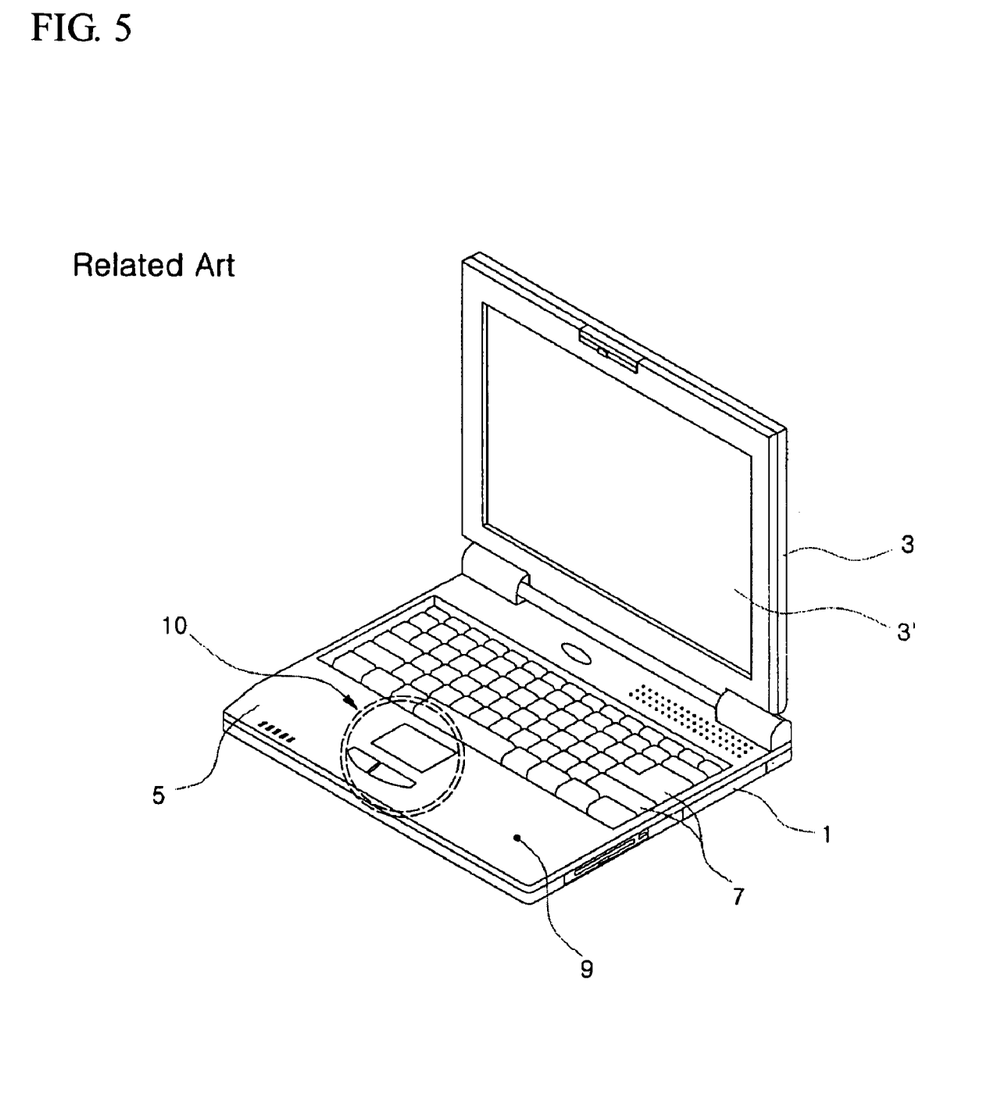
FIG. 5 is a perspective view of a related art portable computer with a touch pad.

Portable computers such as notebook computers generally employ a touch pad device or pointing stick as a pointing device that can be used instead of a mouse while they are carried. FIG. 5 shows a portable computer equipped with a related art touch pad device.

As shown in FIG. 5, the portable computer is mainly composed of a main body 1 and a display unit 3. The display unit 3 can be folded onto a top surface of the main body 1 or unfolded at a predetermined angle as shown in this figure, because an end of the display unit is hinged to a rear end of the main body 1. The display unit 3 includes a display 3' for which a liquid crystal display ("LCD") may be used.

A key deck 5 is formed on the top surface of the main body 1. A plurality of keys 7 are arranged on the key deck 5. An armrest 9, onto which hands of a user are placed when typing using keys 7, is formed at a front end of the main body 1. Further, a touch pad device 10 is provided at the center of the armrest 9.

Figure 5A:
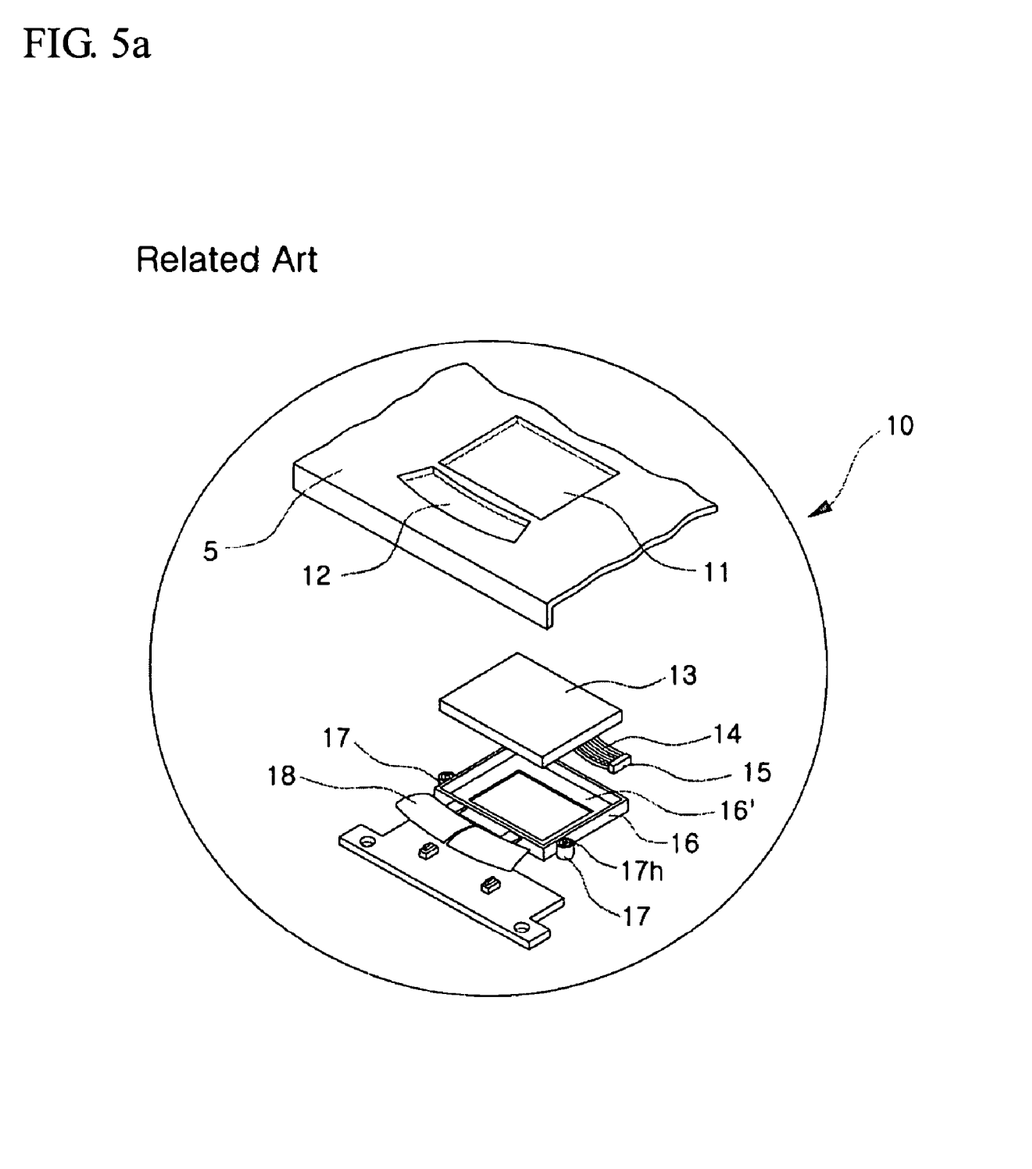
FIG. 5a is an exploded perspective view of the related art touch pad device of FIG. 5.

The configuration of the touch pad device 10 of FIG. 5 is shown in an exploded view in FIG. 5a. The key deck 5 is provided with a pad window 11 and a button through-hole 12. The pad window 11 is generally formed to have a rectangular shape, and the button through-hole 12 is formed ahead of the pad window 11.

A touch pad 13 is securely seated into the pad window 11 from below the key deck 5. The touch pad 13 senses the contact of hands to receive information on the positions where a user intends to point. The touch pad 13 is provided with a cable 14 and a connector 15 in order to send signals to the CPU of the portable computer.

A touch pad housing 16 is provided to fix the touch pad 13 to the key deck 5. The touch pad housing 16 is formed with a seated portion 16' on which the touch pad 13 is securely seated. A lower edge of the touch pad 13 is securely seated on the seated portion 16'.

The touch pad housing 16 is further provided with fastening bosses 17 used to mount the touch pad housing 16 to the key deck 5. Each fastening boss 17 is formed with a fastening hole 17h through which a screw is fastened to the key deck 5.

Buttons 18 are provided at the front end of the touch pad housing 16, which corresponds to a position where the button through-hole 12 is formed. The buttons 18 function to select the position information received through the touch pad 13.

However, the aforementioned prior art has the following problems:

First, since the touch pad housing 16 and the screws are used to allow the touch pad 13 to be fastened into the pad window 11 of the key deck 5, there are problems in that the total number of parts and the man-hours required for assembly are increased.

Further, since the touch pad housing 16 is fastened to a bottom surface of the key deck 5 with screws, there is inconvenience in that the key deck 5 must be separated from the main body 1 in order to perform maintenance on the touch pad 13.

Furthermore, since two screws are used to mount the touch pad housing 16 to the key deck 5, the touch pad housing 16 is not brought into close contact with the bottom surface of the key deck 5 as a whole. Therefore, there is a problem in that electromagnetic (EM) waves generated in the main body 1 leak to the outside through a gap defined between the touch pad housing 16 and the bottom surface of the key deck 5. To solve this problem in the related art, a copper tape may be applied to the touch pad housing 16 and the key deck 5. However, this requires additional man-hours for the assembly and the production costs are increased.

SUMMARY OF THE INVENTION

Accordingly, the present invention is conceived to solve one or more of the aforementioned problems in the related art. An object of the present invention is to provide a touch pad device wherein the number of parts is minimized.

Another object of the present invention is to provide a touch pad device wherein its maintenance can be simply performed.

A further object of the present invention is to provide a touch pad device through which electromagnetic waves generated in a portable computer do not leak to the outside.

According to an embodiment of the present invention for achieving one or more of the objects, there is provided a touch pad device, comprising a touch pad housing that is recessed into and integrally formed on a top surface of a key deck defining a top appearance of a main body. A pad assembly is securely seated into the touch pad housing and includes a touch pad. A pad cover is fastened to the touch pad housing, with the pad assembly installed therebetween. The pad cover may be fastened to the touch pad housing by means of hooks.

Preferably, a pad seating recess into which the touch pad of the pad assembly is seated and a button seating recess into which buttons are seated are formed on the touch pad housing. Engaging holes into which the hooks of the pad cover are hooked are formed along peripheral edges of the touch pad housing. A cable through-hole, through which a cable unit for signal communication between the pad assembly and a main board passes, is formed at one side of the touch pad housing.

More preferably, the touch pad housing further comprises cable passages, depressed deeper than the recesses, to connect the pad seating recess with the button seating recess and the button seating recess with the cable through-hole, respectively.

Further, the pad assembly may comprise the touch pad for receiving pointing data through contact, switches provided on a board for receiving selection signals through buttons, and the cable units for connecting the touch pad and the switches to the outside to transmit signals.

Preferably, the pad cover includes a pad window and a button through-holes corresponding to the pad seating recess and the button seating recess, respectively, and a plurality of the hooks are formed along peripheral edges on an inner surface of the pad cover, such that the hooks are fastened to the engaging holes of the touch pad housing.

According to the portable computer of the present invention, there are advantages in that the man-hours for assembly are reduced because of the minimum number of components. Also, the transfer of electromagnetic waves from the main body through the touch pad device can be reduced. Further, the maintenance of the touch pad can be performed without disassembling the key deck.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, a preferred embodiment of a touch pad device of a portable computer according to the present invention will be described in detail with reference to the accompanying drawings.

Figure 1:
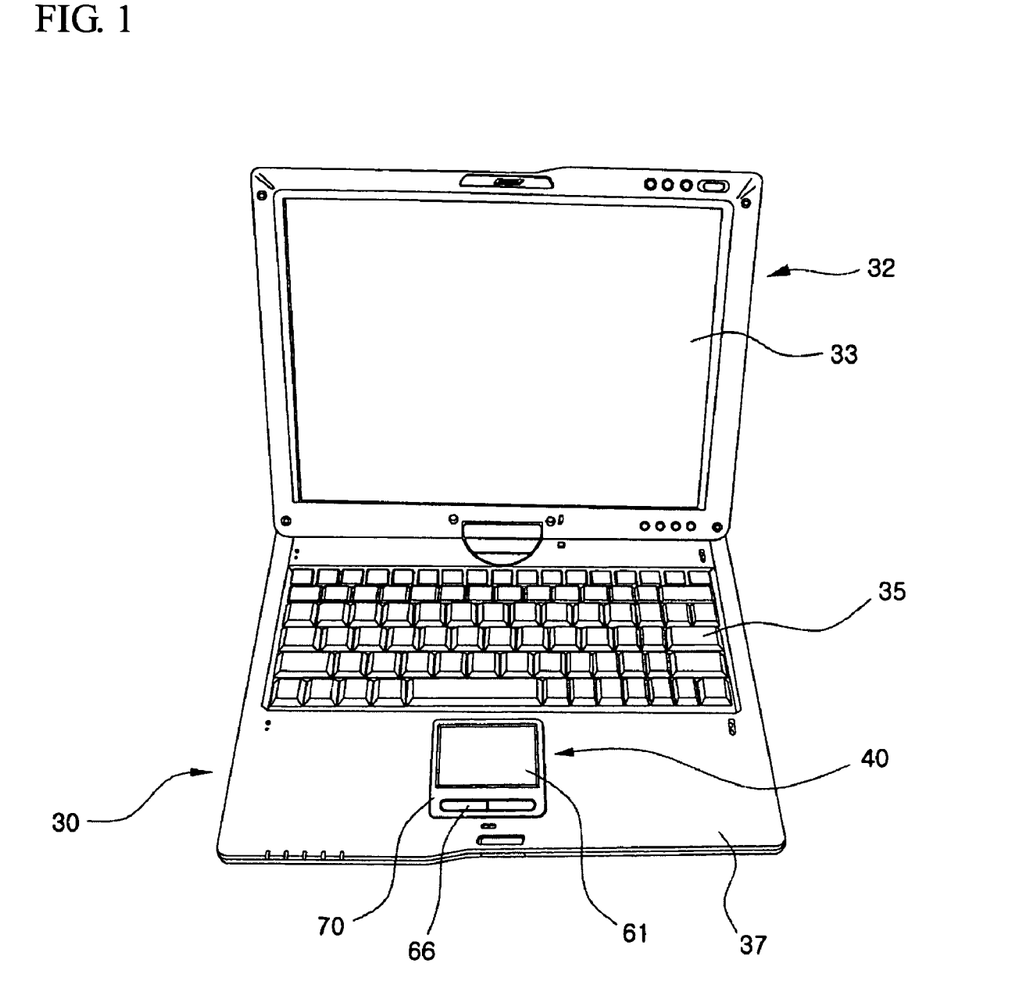
FIG. 1 is a perspective view showing the configuration of a portable computer in accordance with a preferred embodiment of the present invention.
Figure 2:
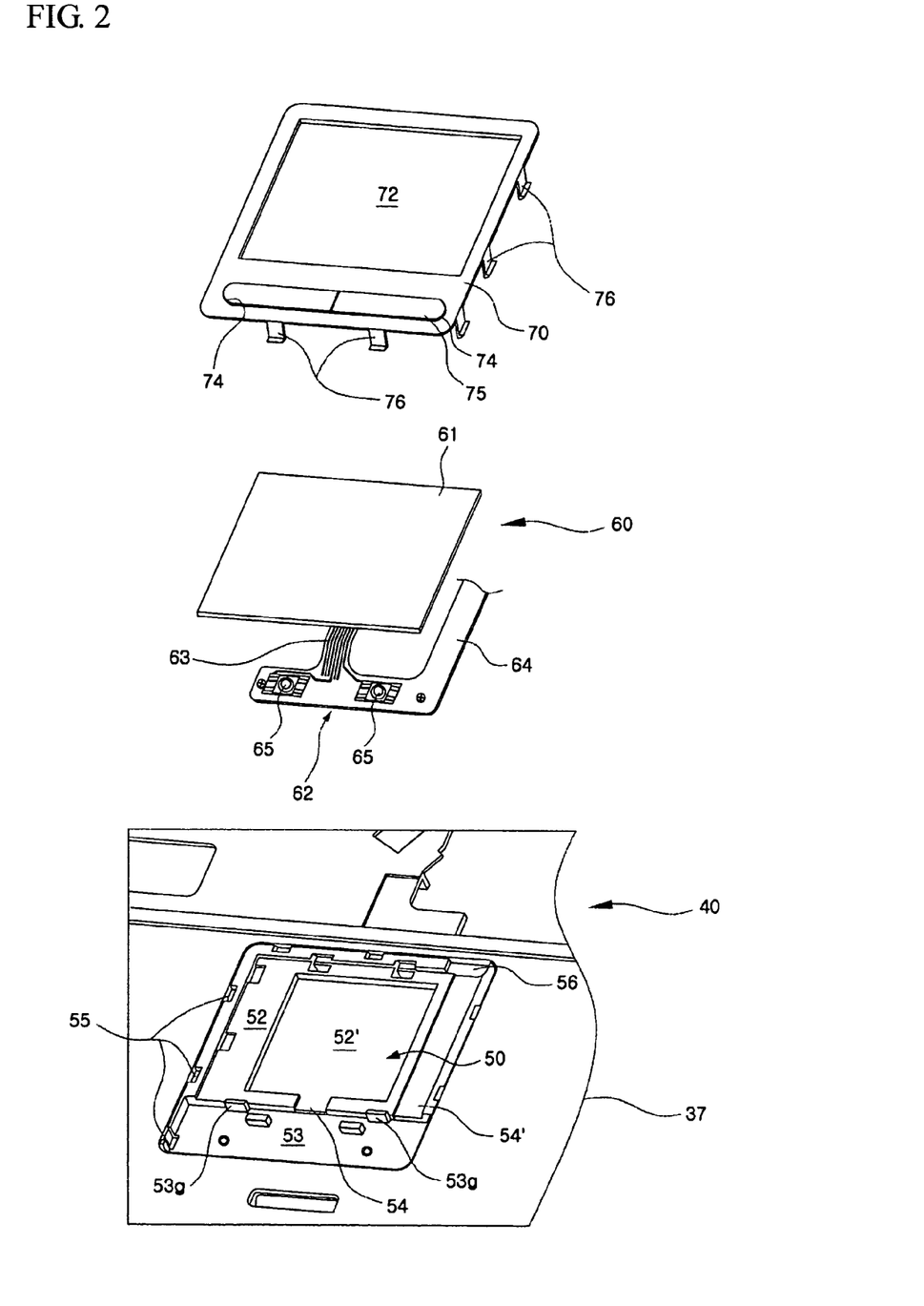
FIG. 2 is an exploded perspective view showing the configuration of a touch pad device, according to the embodiment of the present invention.
Figure 3:
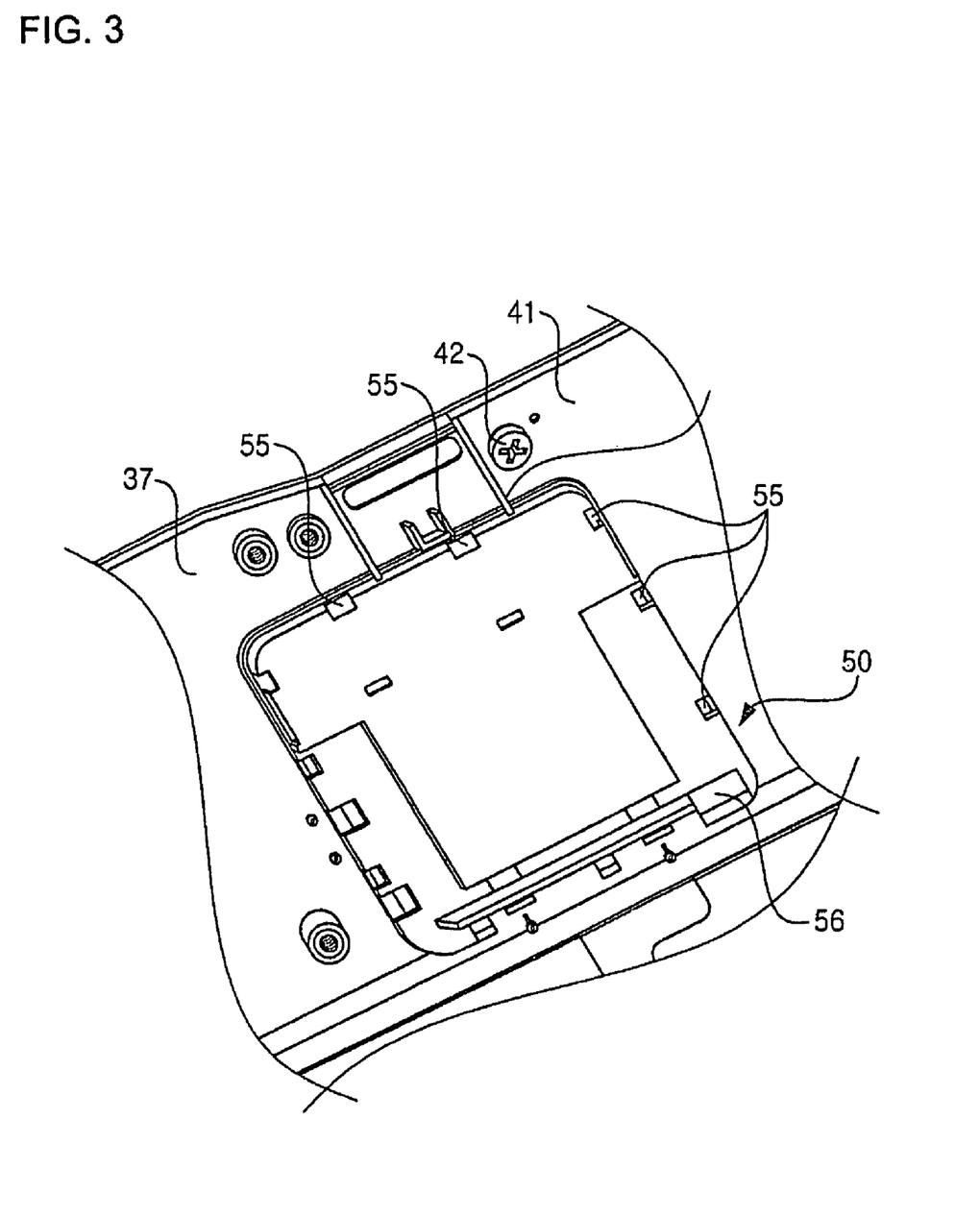
FIG. 3 is a partial bottom view showing the configuration of a touch pad housing, according to the embodiment of the present invention.

FIG. 1 is a perspective view showing the configuration of a portable computer to which the touch pad device according to an embodiment of the present invention is applied; FIG. 2 is an exploded perspective view showing the configuration of the embodiment of the present invention; and FIG. 3 is a partial bottom view showing the configuration of a key deck in which a touch pad housing according to the embodiment of the present invention is provided.

Referring to theses figures, the portable computer is configured in such a manner that a display unit 32 is hinged to and pivoted on a main body 30. The display unit 32 is connected to a rear end of the main body 30 such that the former can be folded onto a top surface of the latter or unfolded at a predetermined angle with respect to the latter.

The display unit 32 is provided with a display 33. The display 33 may employ a liquid crystal display or the like. The display 33 in itself may have a touch screen function. A plurality of keys 35 are arranged on the top surface of the main body 30 in several rows. The keys 35 allow a user to input information into the portable computer through typing.

In addition, a key deck 37 is formed on the top surface of the main body 30. The keys 35 are arranged on a relatively rear portion of the key deck 37. Then, a relatively front portion of the key deck 37 serves as an arm rest on which the user can put his/her hands during typing.

A touch pad device 40 is provided at the center of the front portion of the key deck 37. The touch pad device 40 allows the user to select a specific position on the display 33 via a cursor or movable arrow on the display by moving his/her own finger on the touch pad device 40.

Hereinafter, the configuration of the touch pad device 40 will be described in detail with reference to FIGS. 2 and 3. A touch pad housing 50 is provided at the center of a top surface of the front portion of the key deck 37. The touch pad housing 50 is integrally formed on the key deck 37 to be recessed into the top surface of the key deck 37. As shown in FIG. 3, the touch pad housing 50 protrudes relatively from the bottom surface of the key deck 37. The bottom surface of the touch pad housing 50 and key deck 37 may be coated with a conductive paint to shield EM waves, such that the EM waves do not leak out of the touch pad housing 50 and key dock 37. Also, as illustrated in FIG. 3, a copper ground plate 41 is fixed to the bottom surface of the key deck 37 adjacent to the touch pad housing 50 by fixing means 42.

The interior of the touch pad housing 50 is roughly divided into a pad seating recess 52 and a button seating recess 53. The pad seating recess 52 and the button seating recess 53 are partitioned by a seating guide 53g. The seating guide 53g allows an end of a touch pad 61 to be securely seated into the pad seating recess 52. The pad seating recess 52 is further depressed into the touch pad housing 50 to be stepped along peripheral edges of the touch pad housing 50. This step allows the touch pad 61 to be guided into a desired position. An interference prevention recess 52' is formed to be further depressed into the pad seating recess 52 at the center thereof. The interference prevention recess 52' corresponds to a portion in which a first cable unit 63 and connection components between the touch pad 61 and the first cable unit 63 are securely seated.

A flexible board 62, with switches 65 installed thereon, is securely seated into the button seating recess 53. Both the interference prevention recess 52' and the button seating recess 53 are formed to be depressed relatively deeper than the pad seating recess 52.

A first cable passage 54 is formed in the touch pad housing to connect the pad seating recess 52 and the button seating recess 53 with each other. A second cable passage 54' is depressed to extend from the button seating recess 53 along a side of the pad seating recess 52. The second cable passage 54' starts from the button seating recess 53 and ends at a cable through-hole 56, to be explained later. The first and second cable passages 54 and 54' are formed to be depressed relatively deeper than the pad seating recess 52.

A plurality of receivers, such as engaging holes 55, are formed along the inner peripheral edge of the touch pad housing 50. Three of the engaging holes 55 are provided at lateral sides of the touch pad housing parallel to a fore-and-aft direction of the key deck 37, while two of the engaging holes 55 are provided to front and rear sides parallel to a lateral direction of the key deck 37. Although ten holes 55 have been illustrated, the number of holes is not limited to ten. More or les, the holes may be formed, so long as the number is enough to fix a pad cover 70, to be explained later, to the touch pad housing 50. The engaging holes 55 are formed to vertically penetrate through the touch pad housing 50.

The cable through-hole 56 is formed at a side of the touch pad housing 50. More specifically, the cable through-hole 56 is formed downstream of the second cable passage 54'. The cable through-hole 56 penetrates through the touch pad housing 50 to communicate the interior of the main body 30 and the touch pad housing 50 with each other.

A touch pad assembly 60 is securely seated into the touch pad housing 50. The touch pad assembly 60 is provided with the touch pad 61. The touch pad 61 is seated into the pad seating recess 52 and receives relevant information when the user's finger comes into contact with the top surface thereof. When the touch pad 61 is seated into the pad seating recess 52, both the first and second cable passages 54 and 54' are covered with the touch pad 61. The touch pad 61 is guided in place through the seating guide 53g and the step along the inner peripheral edge of the pad seating recess 52.

The flexible board 62 is also seated into the button seating recess 53. The flexible board 62 is connected to the touch pad 61 via the first cable unit 63 and also to a main board (not shown) via a second cable unit 64. The first cable unit 63 is seated into the first cable passage 54, while the second cable unit 64 is seated into the second cable passage 54'.

The switches 65 are installed on the flexible board 62 at a predetermined interval. The switches 65 are selectively pressed down by means of buttons 75 placed in button through-holes 74 of the pad cover 70, to be explained later. The flexible board 62 is not necessarily flexible, but the board can be integrally formed with the first and second cable units 63 and 64, if it is flexible.

The pad cover 70 covers the interior of the touch pad housing 50 and has the same shape and area as the touch pad housing 50. In this embodiment of the present invention, the pad cover 70 is formed to be rectangular. The pad cover 70 includes a pad window 72 corresponding to the pad seating recess 52 and the button through-holes 74 corresponding to the button seating recess 53. Most of the top surface of the touch pad 61 is exposed to the outside through the pad window 72. The buttons 75 are installed in the button through-holes 74, such that the user can operate the switches 65.

Hooks 76 are formed along peripheral edges on an inner surface of the pad cover 70 at several locations corresponding to the engaging holes 55. The hooks 76 penetrate through the engaging holes 55 to be hooked in an inner surface of the key deck 37 such that the pad cover 70 can be brought into close contact with and fixed to the key deck 37. To this end, the hooks 76 should be formed in such a manner that their length, ranging up to a portion where the hooks are hooked in the inner surface of the key deck 37, corresponds to the depth of the engaging holes 55. Hooks 76 are shown in FIG. 6 as being L-shaped.

Although the hooks 76 are illustrated as being attached to the pad cover 70 and the engaging holds as being provided in the touch pad housing 50, the locations could be reversed.

Hereinafter, the operation of the touch pad device, for use in the portable computer according to the present invention constructed as above, will be described in detail.

In the present invention, the touch pad housing 50 is integrally formed in the key deck 37. That is, the touch pad housing 50 is formed in such a manner that the pad seating recess 52, the button seating recess 53, and the first and second cable passages 54 and 54' are recessed into the top surface of the key deck 37, and that the engaging holes 55 and cable through-hole 56 are then penetrated.

Figure 4:
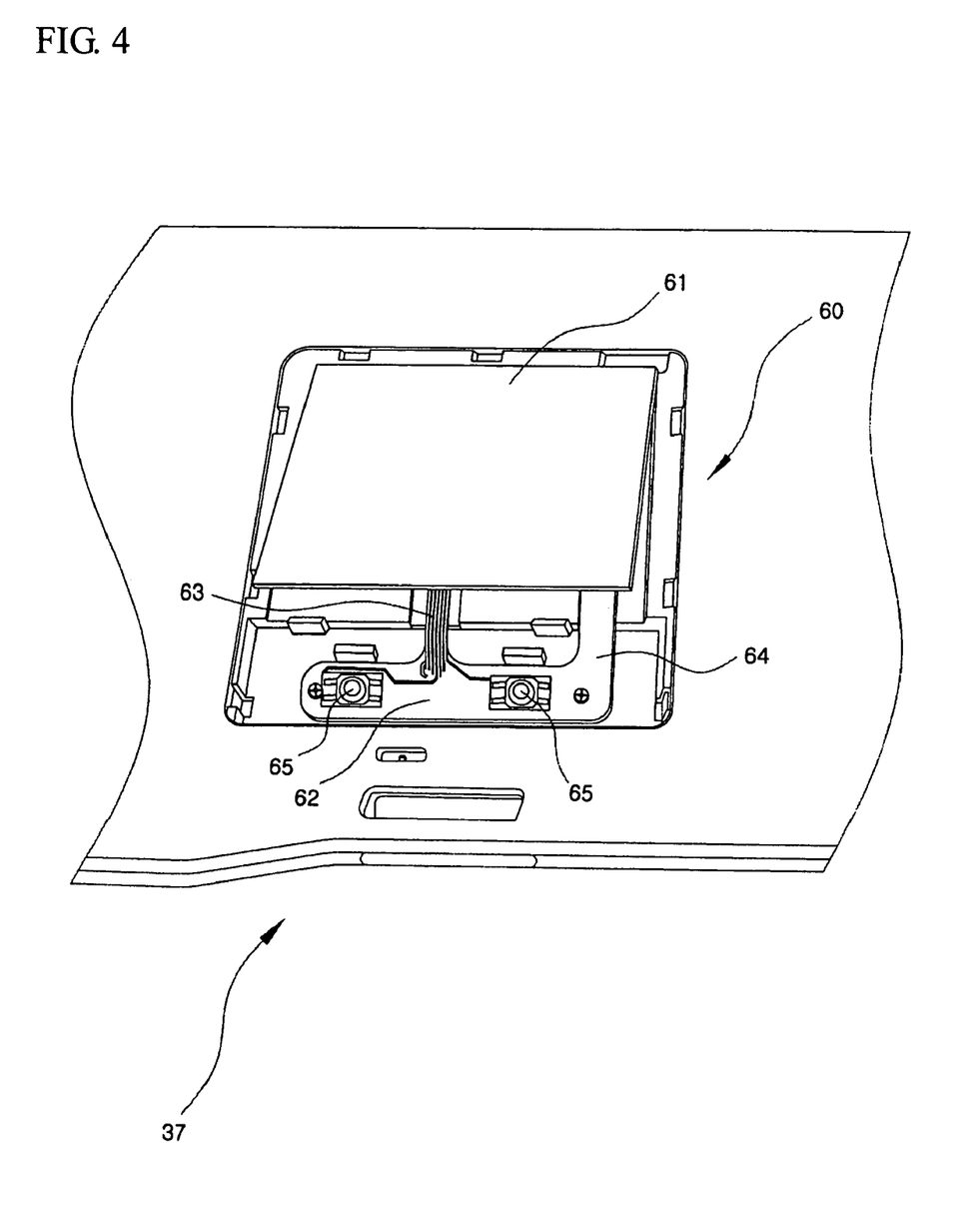
FIG. 4 is a schematic view showing a state where a pad assembly is securely seated on the touch pad housing of a key deck, according to the embodiment of the present invention.

The touch pad assembly 60 is securely seated into the touch pad housing 50 constructed as above. That is, as shown in FIG. 4, the touch pad 61 is seated into the pad seating recess 52. The touch pad 61 is seated in such a manner that its peripheral edge is guided into its seating position by means of the step of the peripheral edge of the pad seating recess 52 and the seating guide 53g. If the touch pad 61 is securely seated into the pad seating recess 52, the first and second cable passages 54 and 54' are covered with the touch pad. Then, the flexible board 62 with the switches 65 installed thereon is also securely seated into the button seating recess 53.

Therefore, the first cable unit 63 for connecting the touch pad 61 and the flexible board 62 is seated into the first cable passage 54. Further, the second cable unit 64 is seated into the second cable passage 54' and then extends into the main body 30 through the cable through-hole 56 to be connected to the main board. The reason that the first and second cable passages 54 and 54' and button seating recess 53 are depressed deeper than the pad seating recess 52 is so that the touch pad 61 cannot be unstably installed due to contract with underlying parts, such as the first and second cable units 63 and 64 electrically connected to the touch pad 61. To assist in the stable mounting of the touch pad 61, the interference prevention recess 52' is further depressed in the position below the touch pad 61.

In such a state, the pad cover 70 is fastened to the touch pad housing 50 from above the key deck 37. That is, the hooks 76, which are formed along the peripheral edge on the inner surface of the pad cover 70, are inserted into the engaging holes 55 and hooked in the inner surface of the key deck 37. If the hooks 76 are hooked in the key deck 37, the pad cover 70 is securely seated into the touch pad housing 50.

If the pad cover 70 has been completely installed, only the touch pad 61, the buttons 75 and the pad cover 70 are exposed to the outside on the top surface of the key deck 37.

When using the touch pad device 40 configured as above, the user can select a desired position on the display 33 by moving his/her finger on the surface of the touch pad 61, so as to move a cursor on the display 33 while his/her finger is brought into contact with the surface of the touch pad 61, and by operating the buttons 75.

According to the touch pad device 40 for use in the portable computer of the present invention as described above in detail, the following advantages can be expected.

First, the touch pad housing 50 is integrally formed on the key deck 37 and additional fasteners, such as screws, do not have to be utilized. Thus, the number of parts can be reduced. Accordingly, there is an advantage in that the number of component parts used in the whole touch pad device can be minimized.

Next, the pad cover 70 can be assembled and separated from above the key deck 37 by prying around the edges. Therefore, there is another advantage in that maintenance or replacement of the touch pad or switches can be relatively easily performed, without opening or removing the key deck 37.

Finally, since the touch pad housing 50 is integrally formed on the key deck 37, the gap between them is eliminated. The only openings would be at the cable through-hole 56 and engaging holes 55. Therefore, there is a further advantage in that electromagnetic waves generated in the main body 30 of the portable computer will only minimally leak to the outside through the touch pad device.

The scope of the present invention is not limited by the illustrated embodiment but defined by the appended claims. It will be apparent that those skilled in the art can make various modifications and changes within the scope of the invention defined by the claims.

What is claimed is:

1. A touch pad device for use in a portable computer comprising:
   a touch pad housing recessed into a top surface of a key deck;
   a pad assembly seated into said touch pad housing and including a touch pad; and a pad cover having substantially the same shape and area as the touch pad housing removably attached to said touch pad housing and to the top surface of said key deck, with said pad assembly installed between said touch pad housing and said pad cover, and wherein said pad cover is removably attached to said touch pad housing by at least one L-shaped hook engaged within at least one receiver located in the touch pad housing.

2. The touch pad device as claim in claim 1, wherein said touch pad housing is integrally formed with said key deck.

3. The touch pad device as claimed in claim 1, wherein said at least one L-shaped hook includes a plurality of hooks extending from peripheral edges of said pad cover, and said at least one receiver is a plurality of holes formed along peripheral edges of said touch pad housing.

4. The touch pad device as claimed in claim 1, wherein a backside of said touch pad housing is coated with a conductive paint to shield electromagnetic waves.

5. The touch pad device as claimed in claim 1, wherein pad assembly includes at least one switch in addition to said touch pad, and wherein said touch pad housing includes a pad seating recess into which said touch pad is seated and a button seating recess into which said at least one switch is seated.

6. The touch pad device as claimed in claim 5, wherein said pad cover includes a pad window and a button through-hole corresponding to said pad seating recess and said button seating recess, respectively, and further comprising:

at least one button provided in said button though-hole to engage and activate said at least one switch.

7. The touch pad device as claimed in claim 5, further comprising:

a seating guide disposed between said pad seating recess and said button seating recess to assist in aligning said touch pad into said pad seating recess.

8. The touch pad device as claimed in claim 5, further comprising:

a first cable extending between said touch pad and said at least one switch; and a first cable passage extending between said pad seating recess and said button seating recess to accommodate said first cable, wherein said first cable passage is recessed deeper into said key deck than said pad seating recess.

9. The touch pad device as claimed in claim 5, wherein said at least one switch includes two switches mounted on a board, and wherein said board is sized and shaped to fit into said button seating recess.

10. The touch pad device as claimed in claim 9, wherein said board is flexible.

11. The touch pad device as claimed in claim 5, further comprising:

a cable through-hole communication from an upper surface of said touch pad housing to a bottom surface of said key deck.

12. The touch pad device as claimed in claim 11, further comprising:

a second cable extending from said at least one switch and passing through said cable through-hole.

13. The touch pad device as claimed in claim 12, further comprising:

a second cable passage accommodating said second cable, wherein said second cable passage is recessed deeper into said key deck than said pad seating recess.

14. A touch pad device for use in a portable computer comprising:

a touch pad housing recessed into a top surface of a key deck, said touch pad housing including a pad seating recessed surface and an interference seating recessed surface inside said pad seating recess, wherein said interferences seating recessed surface is recessed further into said key deck than said pad seating recessed surface;

a pad assembly seated into said touch pad housing and including a touch pad; and a pad cover having substantially the same shape and area as the touch pad housing attached to said touch pad housing and to the top surface of the key deck, with said pad assembly installed between said touch pad housing and said pad cover, wherein said pad cover is removably attached to said touch pad housing by a plurality of L-shaped hooks extending from peripheral edges of said pad cover.

15. The touch pad device as claimed in claim 14, wherein pad assembly includes at least one switch in addition to said touch pad, and further comprising:

a first cable extending between said touch pad and said at least one switch, wherein said interference prevention recessed surface is provided to accommodate said first cable, which exits a backside of said touch pad.

16. The touch pad device as claimed in claim 15, wherein said touch pad housing includes a pad seating recess into which said touch pad is seated and a button seating recess into which said at least one switch is seated, wherein said pad cover includes a pad window and a button through-hole corresponding to said pad seating recess and said button seating recess, respectively, and further comprising:

at least one button provided in said button through-hole to engage and activate said at least one switch.

17. The touch pad device as claimed in claim 16, wherein the plurality of L-shaped hooks extending from peripheral edges of said pad cover are removably attachable to a plurality of holes formed along peripheral edges of said touch pad housing.

18. A method of attaching and/or removing a touch pad assembly relative to a key deck of a portable computer comprising the steps of:

providing a touch pad housing recessed into a top surface of a key deck, a touch pad assembly including a touch pad; and a pad cover having substantially the same shape and area as the touch pad housing;

seating the touch pad assembly into the touch pad housing; and pressing the pad cover toward the touch pad housing to removably attach the pad cover to the touch pad housing and through the top surface of the key deck by at least one L-shaped hook engaged within at least one receiver located in the touch pad housing.

19. The method of claim 18, further comprising the step of:

prying the pad cover away from the key deck to remove the pad cover from the touch pad housing.

* * * * *